United States Patent [19]

Tanigaito et al.

[11] Patent Number: 5,145,457
[45] Date of Patent: Sep. 8, 1992

[54] VENTILATION AIR INTAKE STRUCTURE OF MOTOR VEHICLE

[75] Inventors: Yasushi Tanigaito; Ryoji Maeda, both of Kanagawa, Japan

[73] Assignee: Nissan Motor Co., Ltd., Yokohama, Japan

[21] Appl. No.: 641,518

[22] Filed: Jan. 15, 1991

[30] Foreign Application Priority Data

Jan. 22, 1990 [JP] Japan .................................. 2-12378

[51] Int. Cl.$^5$ ............................................. B60H 1/28
[52] U.S. Cl. ..................................... 454/147; 296/192
[58] Field of Search ................ 98/2.16, 2.17; 296/192, 296/208

[56] References Cited

U.S. PATENT DOCUMENTS

| 4,332,187 | 6/1982 | Imai et al. | 98/2.17 |
| 4,819,550 | 4/1989 | Ioka | 98/2.17 |

FOREIGN PATENT DOCUMENTS

| 48401 | 1/1984 | Japan | 296/192 |
| 23720 | 2/1984 | Japan | 98/2.17 |
| 157871 | 7/1987 | Japan | 296/192 |
| 168710 | 7/1987 | Japan | 98/2.16 |
| 44318 | 2/1989 | Japan | 98/2.16 |

Primary Examiner—Harold Joyce
Attorney, Agent, or Firm—Foley & Lardner

[57] ABSTRACT

A ventilation air intake structure of a motor vehicle is shown, which comprises two side panels incorporated with both a cowl top panel and a dash upper panel to define an air box which extends along a rear upper edge portion of an engine room of the vehicle. The cowl top panel has a first opening and the dash upper panel has a second opening which is communicated with a passenger cabin of the motor vehicle. A drain chamber is constituted by the hood ridge reinforcing member and one of the side panels. The drain chamber has a downwardly extending narrower passage which is exposed to the open air at a terminal open end thereof. The dash upper panel is formed with a laterally extending channel which has a shallower end portion which passes under the side panel and is exposed at its terminal end to the narrower passage at a position above the terminal open end of the downwardly extending narrower passage. The second opening of the dash upper panel is positioned higher than the extreme end of the shallower end portion of the channel with respect to the vehicle body.

7 Claims, 3 Drawing Sheets

VENTILATION AIR INTAKE STRUCTURE OF MOTOR VEHICLE

BACKGROUND OF THE INVENTION

1. Field of the Invention

The present invention relates in general to ventilation air intake structures of a motor vehicle, and more particularly, to ventilation air intake structures of a type which can smoothly drain rainwater therefrom.

2. Description of the Prior Art o In order to clarify the task of the present invention, one of the conventional ventilation air intake structures will be described with reference to FIGS. 4 and 5 of the accompanying drawings, and which is described in Japanese Patent First Provisional Publication No. 59-23720.

It is to be noted that the structure shown in FIG. 4 is a view taken from a front corner position of the associated motor vehicle.

In the drawings, denoted by numeral 1 is an elongate air box which extends laterally along a rear upper edge portion of an engine room (not shown). The elongate air box 1 is defined by a cowl top panel 2, a dash upper panel 3 and two side panels 4 (only one is shown), which are combined to constitue an elongate air box chamber. Longitudinally opposed ends of the air box 1 are each connected to both a hood ridge reinforcing member 12 and a front pillar 6.

As is seen from FIG. 5, the cowl top panel 2 is formed with an air intake opening 2a, while, the dash upper panel 3 is formed with an opening 3a. The air intake opening 2a is used for introducing fresh air into the air box 1, while, the opening 3a is used for carrying the fresh air in the air box 1 toward a passenger cabin (not shown). An intake tube 40 extends from the opening 3a to the passenger cabin for achieving this air flow. From the periphery of the opening 3a of the dash upper panel 3, there is raised an annular wall 7 which is projected into the air box 1 to serve as a water stopper. Each side panel 4 and the dash upper panel 3 constitute a small passage 8 which is provided with a one-way valve 9. The valve 9 permits only a flow of water in the direction from the air box 1 toward a drain passage 10 which is defined by the hood ridge reinforcing member 12, the side panel 4 and the side end portion of the dash upper panel 3. The drain passage 10 has a drain opening 11 formed in the hood ridge reinforcing member 12. Thus, as is understood from FIG. 4, the drain passage 10 is exposed to the outside of the vehicle at the drain opening 11.

Thus, rainwater in the air box 1 is permitted to flow through the small passage 8, the one-way valve 9 and the drain passage 10 and finally drain into the outside through the drain opening 11.

However, due to its inherent construction, the above-mentioned conventional ventilation air intake structure has the following drawbacks.

First, because the bottom of the air box 1 and the drain opening 11 are arranged at substantially the same height, effective draining of water from the drain opening 11 is not achieved. Although the water draining is somewhat improved when the size of the drain opening 11 is enlarged, this measure lowers the mechanical strength of the hood ridge reinforcing member 12. Furthermore, the enlargement in size of the drain opening 11 causes lowering of not only the sound insulation effect but also the offensive odor shutting effect provided by a passage between the air box 1 and the drain opening 11. Furthermore, the enlargement of the drain opening 11 lowers the natural ventilation effected by the ram pressure produced when the vehicle is moving.

Second, if the drain opening 11 is reduced in size for eliminating the above-mentioned drawbacks, the water draining effect is lowered. Furthermore, in this case, undesired back flow of the water tends to occur in the passage between the air box 1 and the drain opening 11 particularly when the vehicle is moving and the air inlet opening 2a is covered with a foreign object, such as, snow and the like.

SUMMARY OF THE INVENTION

It is therefore an object of the present invention to provide a ventilation air intake structure for a motor vehicle, which is free of the above-mentioned drawbacks.

According to the present invention, there is provided a ventilation air intake structure of a motor vehicle. The structure comprises two side panels incorporated with both a cowl top panel and a dash upper panel to define an air box which extends along a rear upper edge portion of an engine room of the vehicle; first means defining in the cowl top panel a first opening and in the dash upper panel a second opening, the second opening being communicated with a passenger cabin of the motor vehicle; second means defining a drain chamber which is constituted by the hood ridge reinforcing member and one of the side panels, the drain chamber having a downwardly extending narrower passage which is exposed to the open air at a terminal open end thereof; and third means providing the dash upper panel with a laterally extending channel which has a shallower end portion, the shallower end portion passing under the one side panel and being exposed at its terminal end to the narrower passage at a position above the terminal open end of the downwardly extending narrower passage, wherein the second opening of the dash upper panel is positioned higher than the extreme end of the shallower end portion of the channel with respect to the vehicle body.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
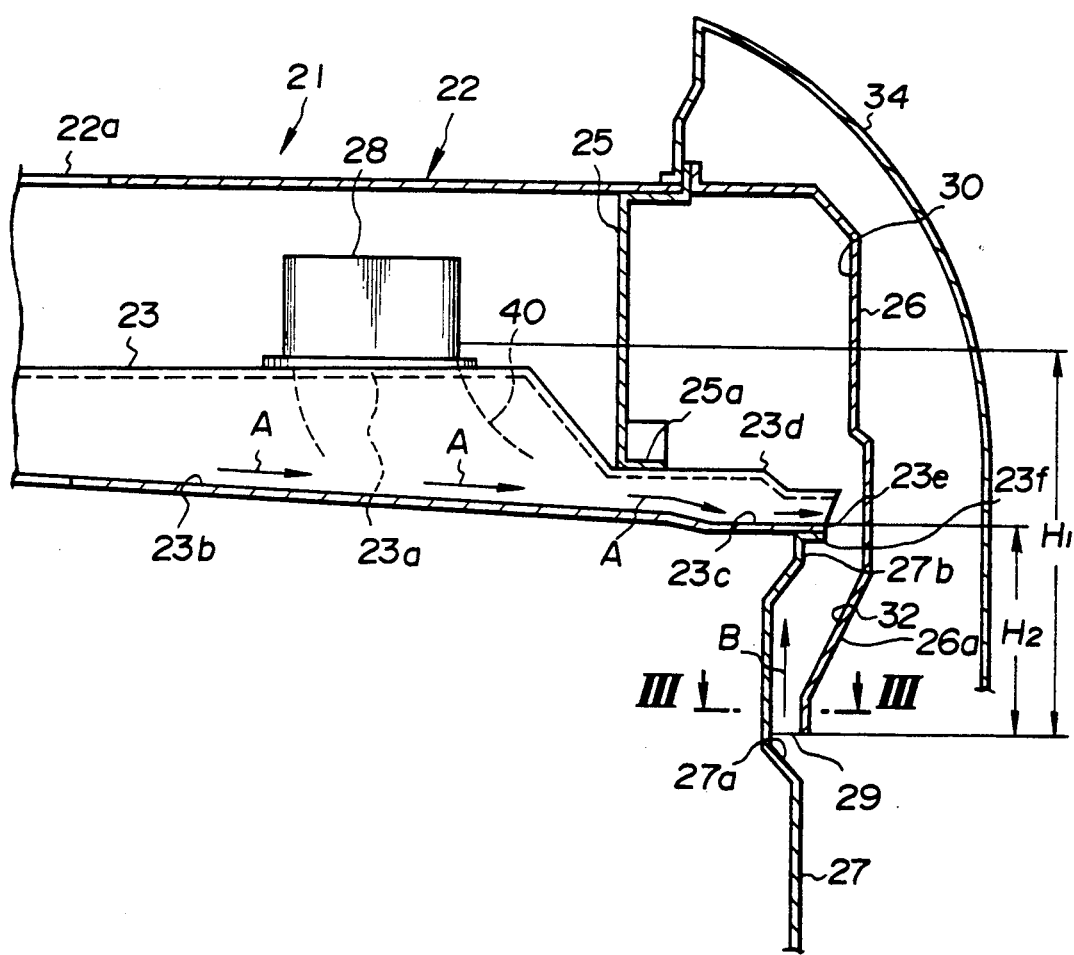
FIG. 1 is a sectional view of an essential portion of a ventilation air intake structure of the present invention, the view being taken along the line I—I of FIG. 2.
Figure 2:
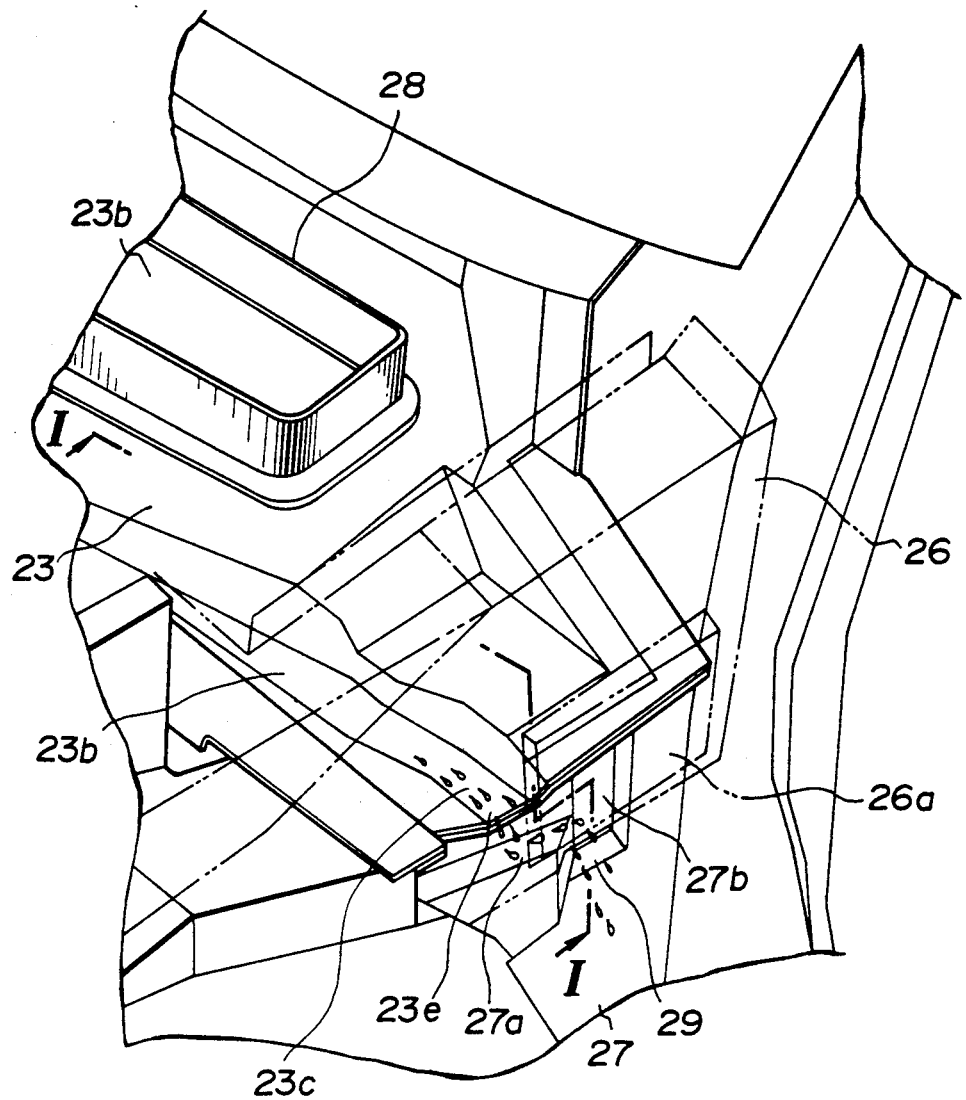
FIG. 2 is a perspective view of the essential portion of the ventilation air intake structure.
Figure 3:
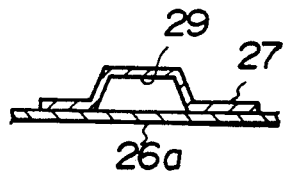
FIG. 3 is a sectional view taken along the line III—III of FIG. 1.
Figure 4:
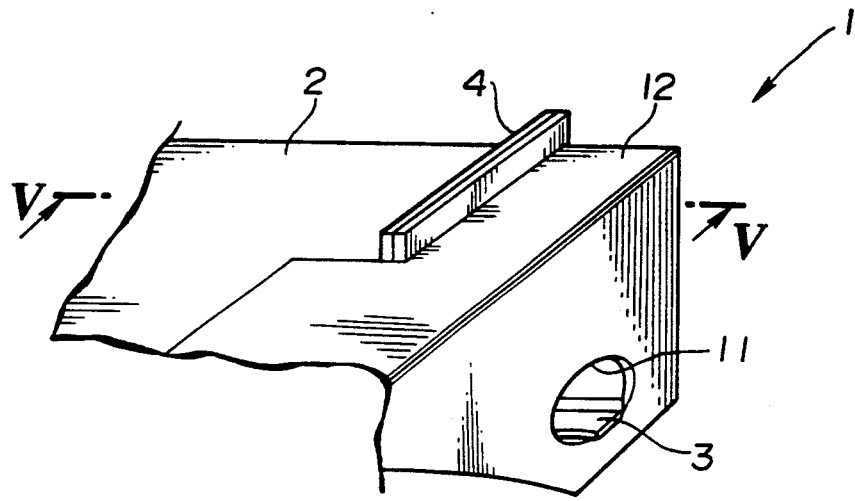
FIG. 4 is a perspective view of an essential portion of a conventional ventilation air intake structure.
Figure 5:
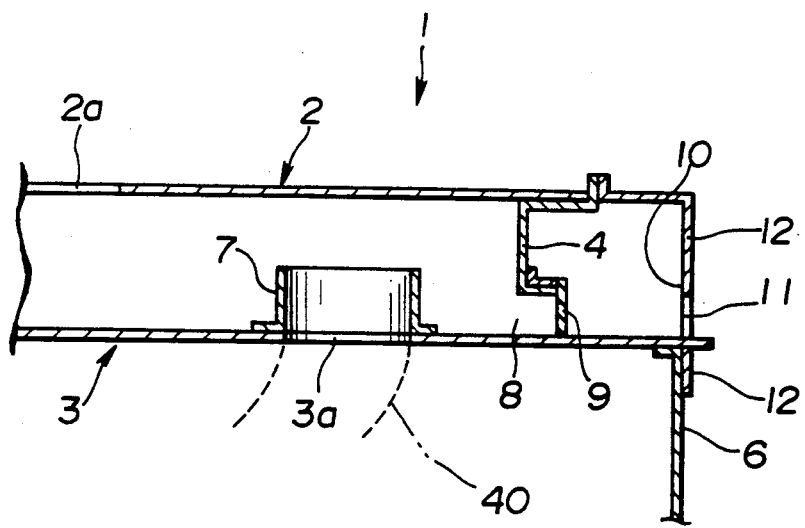
FIG. 5 is a sectional view taken along the line V—V of FIG. 4.

Referring to FIGS. 1 to 3, there is shown a ventilation air intake structure according to the present invention.

In the drawings, denoted by numeral 21 is an elongate air box which extends laterally along a rear upper edge portion of an engine room (not shown). The elongate air box 21 is defined by a cowl top panel 22, a dash upper panel 23 and two side panels 25 (only one is shown), which are combined to constitue an elongate air box chamber. The cowl top panel 22 is formed with an air intake opening 22a for introducing fresh air into the air box 21, while, the dash upper panel 23 is formed with an opening 23a for carrying the fresh air in the air box 21 toward a passenger cabin (not shown) of the vehicle. As shown, the opening 23a is offset with respect to the air intake opening 22a.

An air intake tube 40 extends from the opening 23a to the passenger cabin and an electric air suction pump (not shown) is installed at a downstream portion of the air intake tube, so that, upon operation of the pump, the fresh air is driven into the passenger cabin through the air intake opening 22a, the interior of the air box 21, the opening 23a, and the air intake tube 40. One example of the flow of air in this fashion is disclosed in Japanese Patent First Provisional Publication No. 59-23720.

From the periphery of the opening 23a of the dash upper panel 23, there is raised a rectangular wall 28 which projects into the air box 21 to serve as a water stopper.

Designated by numeral 34 is a fender panel of the motor vehicle, which has an upper portion secured to the cowl top panel 22.

Longitudinally opposed ends of the air box 21 are each connected at an upper portion to a hood ridge reinforcing member 26 and at a lower portion to a front pillar 27. The side panel 25 and the hood ridge reinforcing member 26 constitute a drain chamber 30 positioned beside the air box 21. The drain chamber 30 has a downwardly extending narrower passage 32 which is defined between a lower portion 26a of the hood ridge reinforcing member 26 and the front pillar 27.

As will be understood from FIGS. 1 and 2, the dash upper panel 23 is formed at its supper surface near the opening 23a with a channel 23b which extends laterally along the elongate air box 21. The channel 23b is provided by means of press working. As is seen from FIG. 1, the bottom wall of the channel 23b is somewhat sloped down toward the longitudinal end thereof. The channel 23b has a shallower end portion 23c which passes under the side panel 25 and is exposed to the drain chamber 30. Designated by numeral 25a is a lower flange of the side panel 25, which is welded to a depressed portion 23d of the dash upper panel 23.

As is seen from FIG. 1, the extreme end 23e of the shallower end portion 23c is projected beyond a vertical part 27b of the front pillar 27 at a position above the downwardly extending narrower passage 32. Designated by numeral 23f is a flange of the front pillar 27, which is welded to the extreme end 23e of the shallower end portion 23c of the channel 23b.

As will be understood from FIG. 2, the downwardly extending narrower passage 32 is somewhat inclined in the fore and aft direction of the vehicle body having its lower open end 29 located in the rear of its upper end near the extreme end 23e of the channel 23b. For permitting the oblique extending of the narrower passage 32, the front pillar 27 has a slanted shelf part 27a which extends rearwardly and downwardly.

As is seen from FIG. 1, the lower open end 29 of the narrow passage 32 is positioned below the opening 23a of the dash upper panel 23 by the distance of "$H_1$" and below the extreme end 23e of the channel 23b by the distance of "$H_2$".

In the following, operation of the ventilation air intake structure of the invention will be described with reference to FIGS. 1 and 2.

Under operation of the electric air suction pump, fresh air is driven into the passenger cabin through the air intake opening 22a, the air box 21, the opening 23a and the air intake tube 40.

When, during a rainy day, rainwater flows into the air box 21 through the air intake opening 22a, the same is collected in the channel 23b and then flows toward the extreme end 23e of the channel 23b along the sloped bottom wall of the channel 23b, as is indicated by the arrows "A" in FIG. 1. It is to be noted that provision of the rectangular wall 28 prevents the rainwater from entering the opening 23a of the dash upper panel 23.

The rainwater then drops from the extreme end 23e of the channel 23b onto the slanted shelf part 27a and its neighbouring and flows on the same rearwardly and downwardly toward the lower open end 29 of the narrower passage 32 and finally drops into the open air from the lower open end 29.

In the following, advantages of the present invention will be described.

First, because the opening 23a of the air box 21 and the extreme end 23e of the channel 23b have a considerable difference in height (viz., "$H_1-H_2$") therebetween, rainwater in the air box 21 is effectively drained from the extreme end 23e even when the lower open end 29 of the narrower passage 32 is somewhat reduced in size. The sloped bottom wall of the channel 23b promotes this water draining operation.

Second, because neither the hood ridge reinforcing member 26 nor the front pillar 27 has an opening corresponding to the drain opening 11 of the aforementioned conventional ventilation air intake structure, the mechanical strengh of these members is not lowered.

Third, since the size of the opening 29 can be reduced without sacrificing the water draining effect, the sound insulation effect, and the offensive oder shutting effect, which are provided by the passage between the opening 29 and the opening 23a, the functioning of these features are heightened. Furthermore, the reduction in size of the opening 29 brings about increased ram pressure at the opening 29, so that the natural ventilation provided by the ventilation air intake structure is improved.

Fourth, even when the motor vehicle is moving with the air intake opening 22a covered with a foreign objects such as snow or the like, the undesired back flow of water in the narrower passage 32 does not occur. In fact, under such condition, there is produced a back flow of air in the narrow passage 32 as is indicated by the arrow "B". However, both the difference (viz., "$H_2$") in height between the extreme end 23e of the channel 23b and the opening 29a and the provision of the projected upper flange 23fa prevent the water from backflowing into the channel 23b from the extreme end 23e.

What is claimed is:

1. A ventilation air intake structure for a motor vehicle, said ventilation air intake structure comprising:

a cowl top panel having an opening therein;

a dash upper panel having an opening therein, said dash upper panel opening being in communication with a passenger cabin of said motor vehicle;

two side panels incorporated with both said cowl top panel and said dash upper panel to define an air box which extends along a rear upper edge portion of an engine room of the motor vehicle; and a hood ridge reinforcing member, said hood ridge reinforcing member and one of said side panels defining a drain chamber having a downwardly extending narrower passage which is opposed to the open air at a terminal open end thereof;

wherein said dash upper panel has a laterally extending channel which has a shallower end portion, said shallower end portion passing under said one side panel and being exposed at its terminal end to said narrower passage at a position above said terminal open end of said downwardly extending narrower passage, wherein said opening of said dash upper panel is positioned higher than said extreme end of said shallower end portion of said channel with respect to the vehicle body.

2. A ventilation air intake structure as claimed in claim 1, in which said laterally extending channel is a groove which is provided by means of press working.

3. A ventilation air intake structure as claimed in claim 2, in which a bottom wall of said channel is sloped downwardly toward the terminal end thereof.

4. A ventilation air intake structure as claimed in claim 3, in which said downwardly extending narrower passage is inclined in the fore and aft direction of the vehicle body having its lower open end located in the rear of its upper end.

5. A ventilation air intake structure as claimed in claim 4, in which said downwardly extending narrower passage is defined by a slanted shelf part of said front pillar, said slanted shelf part extending rearwardly and downwardly with respect to the vehicle body.

6. A ventilation air intake structure as claimed in claim 5, in which the terminal end of said shallower end portion of said laterally extending channel is projected into said narrower passage of said drain chamber beyond a vertical part of said front pillar.

7. A ventilation air intake structure as claimed in claim 6, in which said second opening of said dash upper panel has an enclosed wall raised around a periphery thereof, said enclosed wall being projected into the interior of said air box.

* * * * *